Feb. 6, 1968     SEITARO HATSUTA     3,367,276
RECIPROCATING PUMP
Filed Aug. 31, 1966
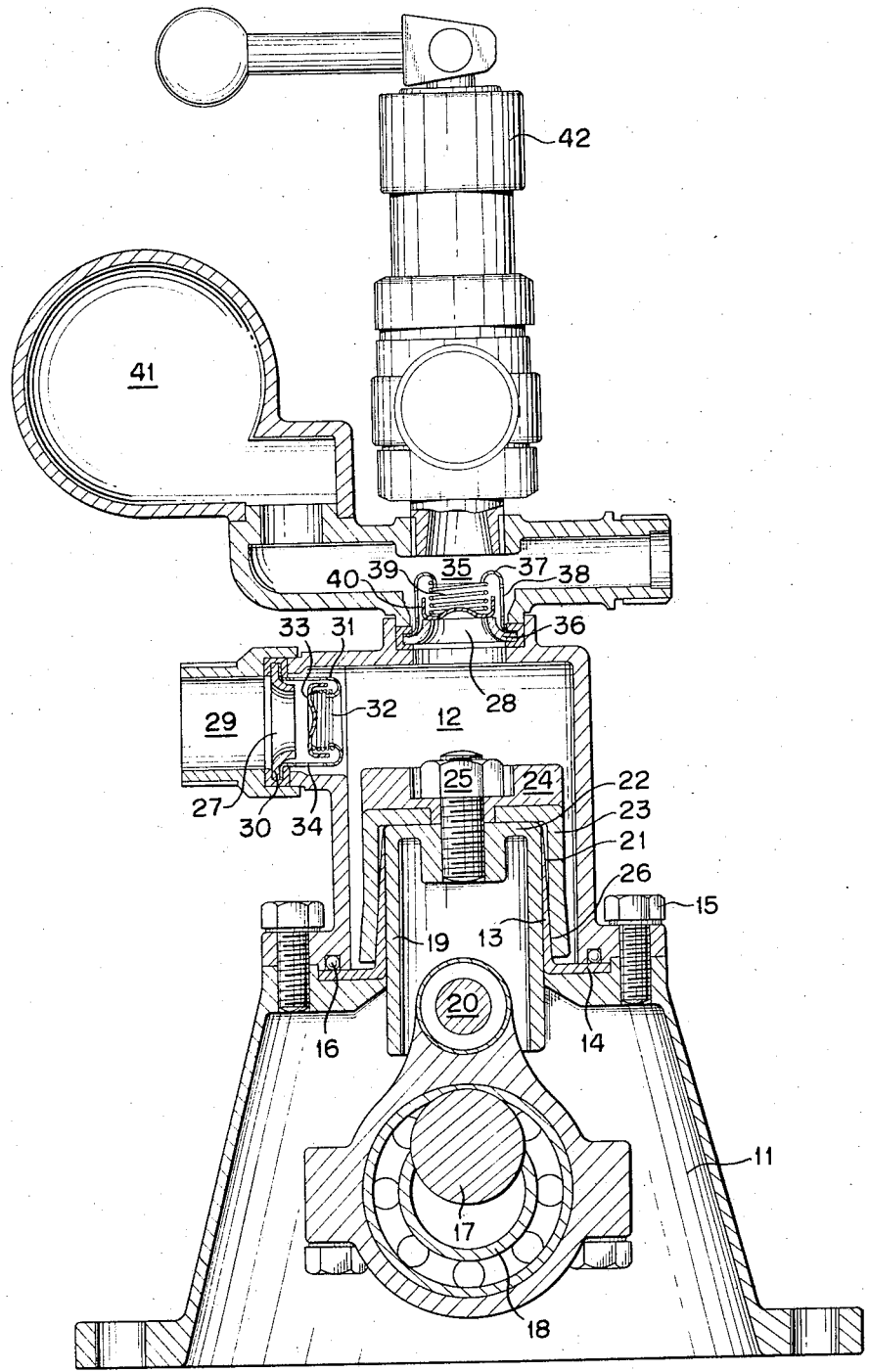

United States Patent Office 3,367,276
Patented Feb. 6, 1968

3,367,276
RECIPROCATING PUMP
Seitaro Hatsuta, 16 3-chome, Tonda-cho,
Takatsuki-shi, Osaka-fu, Japan
Filed Aug. 31, 1966, Ser. No. 576,366
2 Claims. (Cl. 103—153)

The present invention relates to an improvement of reciprocating pump having a construction which prevents leakage of fluid into the cylinder from the pump chamber by the fluid pressure in the pump chamber when moving fluid from the suction side to the discharge side.

The principal object of the invention is to provide a reciprocating pump in which a cup-like member made of elastic material such as rubber or synthetic resin and which is attached to the piston slideably contacts the outer circumferential surface of the cylinder by which the above-mentioned cup-like member is pressed against the outer circumferential surface of the cylinder by the fluid pressure in the pump cylinder to cause automatic compression effect.

Another object of this invention is to provide a reciprocating pump in which the frictional resistance between the aforementioned cup-like member and outer circumferential surface of the cylinder is reduced towards the advancing direction of the piston in the discharge stroke of the pump by forming a tapered surface of small diameter along the diameter of the reciprocating axis of the piston at the tip of the outer circumferential surface of the cylinder.

A further object of the invention is to provide a reciprocating pump in which the pump is made small in size by making the cylinder and pump chamber separate and providing the cylinder between the pump chamber and crank chamber.

In the pump of this invention, the outer circumferential surface of the cylinder provided between the crank chamber and pump chamber forms a tapered circumferential surface whose outer diameter of the crank chamber side becomes larger gradually, a cup-like member made of elastic material is fitted to the piston head which moves in the cylinder and is constructed so that the inner circumferential surface of the cup contacts the aforementioned tapered circumferential surface.

Consequently, in case of the reciprocating pump of this invention, the cup-like member is pressed against the outer circumferential surface of the cylinder automatically by the fluid pressure in the pump chamber to positively maintain air-tightness of the sliding part and the outer circumferential surface of the cylinder has been tapered so that its outer diameter becomes larger toward the crank chamber side. As a result, the frictional resistance of the tapered surface of the cylinder and the inner circumferential surface of the cup-like member can be reduced gradually as it moves toward the direction of the piston advances during the discharge stroke of the pump. Furthermore, it is possible to make the pump small in size as the cylinder and pump chamber are made separate and a cylinder has been provided between the pump chamber and crank chamber.

The invention will be better understood from the following discription taken in connection with the accompanying drawing and its scope will be pointed out in the appended claims.

The figure is a fragmentary longitudinal sectional view showing the condition in which the pump of the invention is used as a water feed pump.

In the figure, a crank chamber 11 and a pump chamber 12 are fixed by bolts 15 with a flange 14 which is provided at the lower part of a cylinder 13 contained between them. A packing 16 is provided in a groove on the pump chamber side. A connecting rod 18 is fitted to a crank shaft 17 which is positioned in the center of the crank chamber 11 and a piston pin 20 connects the tip of the connecting rod 18 and a lower part of piston 19 which fits into the cylinder 13. The outer circumferential surface of the cylinder 13 has a tapered circumferential surface 21 so that the outer diameter becomes smaller towards the tip. A cup-like member 23 made of elastic material such as rubber or synthetic resin is fitted on a head 22 of the piston, a pressure plate 24 is placed on this and bolted to the head 22 so that an inside surface 26 at the mouth of the elastic cup-like member 23 contacts the tapered circumferential surface 21 of the cylinder 13. A ffuid suction part 27 and a discharge part 28 are provided in the pump chamber 12, annular members 30, 31 with the base part contacting each other are attached between the pump chamber 12 of the suction part 27 side and a suction pipe 29, and a valve member 33 is pressed against the opening of the annular member 30 by means of a spring 32 which is present in its tip. A plurality of connecting holes 34 are provided on the circumferential surface of the annular member 31.

Annular members 36, 37 are attached between the pump chamber 12 of the discharge part 28 side and discharge part 28 in the same manner as mentioned above and a valve member 40 is pressed against the opening of the annular member 36 by a spring 39 of the annular body 37 side which has connecting holes 38. An air chamber 41 is attached to a discharge pipe 35 side and this has been provided to minimize the change in pressure in the suction pipe 29 and the discharge pipe 35. A relief valve chamber 42 is provided in the discharge tube 35 connected to the discharge valve 40.

During the suction stroke of a reciprocating pump composed as mentioned above, the connecting rod 18 which is articulately attached to the crank shaft 17 is moved downward by the rotation of the crank shaft 17 which has been positioned in the middle of the crank chamber 11 and first, the piston 19 moves downward by way of the piston pin 20. The pressure in the interior of the pump chamber 12 is reduced by the downward movement of the piston 19 and liquid is suctioned into the pump chamber 12 side by the suction valve 33 against the spring 32 as a result of the reduced pressure, by which the fluid of the suction pipe 29 is suctioned into the pump chamber 12 from the suction part 27 through the clearance between the valve member 33 and the annular member 30 by way of connecting holes 34 of the annular member 31.

At this time, the frictional resistance between the inner surface of the mouth of the cup-like member 23 and the tapered circumferential surface 21 of the cylinder increases as the quantity of water suctioned into the pump chamber 12 increases, that is as the cup-like member 23 moves towards the larger diameter part of the tapered circumferential surface 21 of the cylinder 13 to completely prevent leakage of the fluid into the pump chamber during the suction stroke.

Next, during the discharge stroke, the cup-like member 23 moves towards the smaller diameter part of the tapered circumferential surface 21 of the cylinder 13 as the piston 19 moves upward and as a result, the discharge valve 40 opens against the spring 29 by the liquid pressure and the fluid flows out from the pump chamber 12 into the discharge pipe 35.

At this time, the frictional resistance between the inside surface of mouth 26 of the cup-like member 23 and the tapered circumferential surface 21 of the cylinder 13 decreases gradually as the cup-like member 23 moves to the smaller diameter part of the tapered surface 21 of the cylinder 13 and as a result, the frictional resistance which is applied to the air-tight sliding part is maintained as small as permissible, that is sufficient to prevent leakage of the fluid in that condition, in accordance with the fluid pressure in the pump chamber 12, by which unnecessary frictional resistance can be eliminated.

Obviously many modifications and variations concerning this invention are possible in the light of the above teachings. It is, therefore, to be understood that this invention may be practiced otherwise than as described.

What is claimed is:

1. An improvement of reciprocating pump having a pump chamber and a crank chamber secured to said pump chamber, characterized by a piston mechanism comprising, a cylindrical member having a bottom flange portion disposed at a connecting portion of said pump chamber with said crank chamber, said cylindrical member provided with a cylindrical inner surface having uniform diameter and tapered outer circumferential surface becoming smaller toward its tip, a piston connected with a crank mechanism disposed in said crank chamber in such a way that said piston is slidably engaged with the inner cylindrical surface of said tapered cylindrical member, an elastic cap member secured at its head portion to the tip portion of said piston by a fastener member in such a way that an inside surface of a mouth of said elastic cap member slidably engages with said tapered outer circumferential surface of said cylindrical member, thereby, during the reciprocating motion of said piston mechanism, said inside surface of a mouth of said elastic cap member continuously contacts with said tapered outer surface of said cylindrical member so that leakage of fluid into said crank chamber from said pump chamber is prevented when moving fluid from a suction side to a discharge side.

2. An improvement of reciprocating pump having a pump chamber and a crank chamber secured to bottom opened portion of said pump chamber, characterized by a piston mechanism comprising, a cylindrical member having a bottom flange portion disposed at a connecting portion of said pump chamber with said crank chamber, said cylindrical member provided with a cylindrical inner surface having uniform diameter and tapered outer circumferential surface becoming smaller towards tip, a piston connected with a crank mechanism disposed in said crank chamber by a connecting pin, said piston slidably engaged with the inner cylindrical surface of said cylindrical member, an elastic cap member secured at its head portion to the tip portion of said piston by a fastener in such a way that an inside surface of a mouth of said elastic cap member slidably engages with said tapered outer circumferential surface of said cylindrical member, said fastener member comprises a pressure plate secured to the tip portion of said piston by a bolt in such a way that head portion of said elastic member is secured between said pressure plate and the tip portion of said piston, thereby, during the reciprocating motion of said piston mechanism, inside surface of a mouth of said elastic cap member continuously contacts with said tapered outer surface of said cylindrical member so that leakage of fluid into said crank chamber from said pump chamber is prevented when moving fluid from a suction side to a discharge side.

References Cited

UNITED STATES PATENTS

| | | | |
|---|---|---|---|
| 1,527,598 | 2/1925 | Magann | 92—168 XR |
| 1,549,175 | 8/1925 | Adams et al. | 103—158 XR |

ROBERT M. WALKER, *Primary Examiner.*